April 12, 1927.
C. HAFFKE
1,624,406
TRACTOR PLOW
Filed April 21, 1923
2 Sheets-Sheet 1
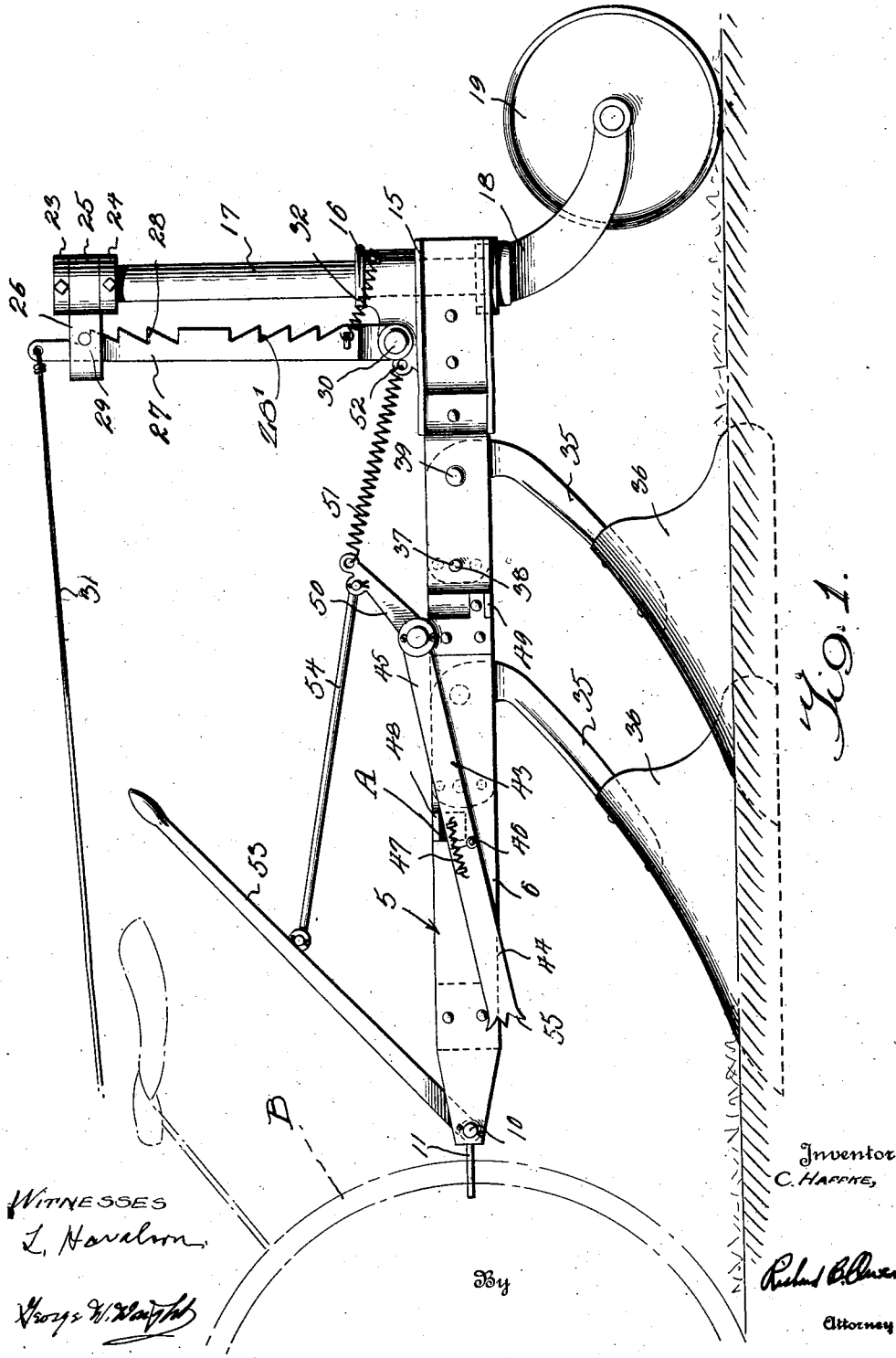

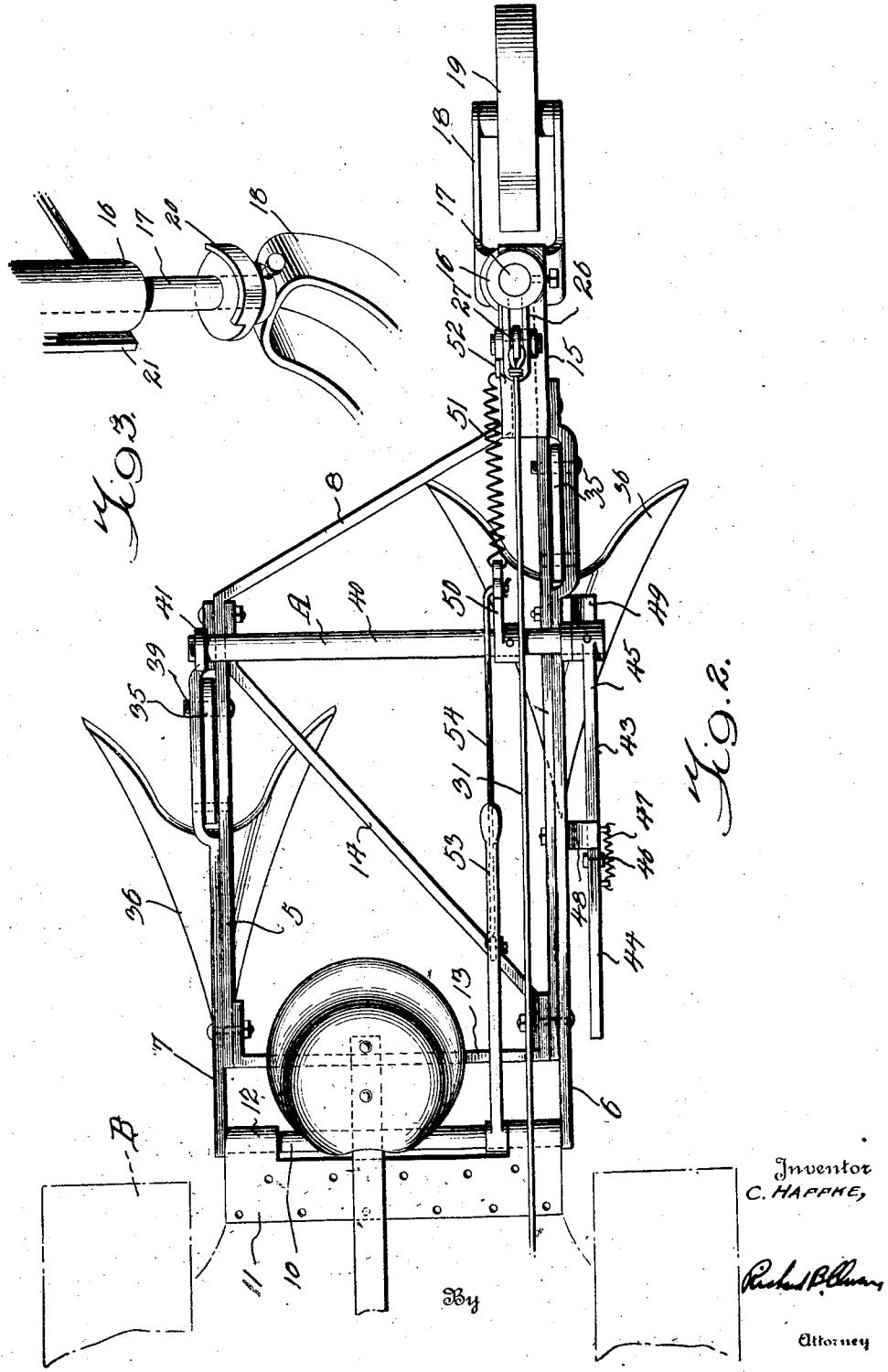

Patented Apr. 12, 1927.

1,624,406

UNITED STATES PATENT OFFICE

CHARLES HAFFKE, OF WASHINGTON, ARKANSAS.

TRACTOR PLOW.

Application filed April 21, 1923. Serial No. 633,676.

This invention relates to plows and more particularly to plows which are adapted to be drawn by tractors, and the primary object of the invention is to provide a novel plow and novel means for connecting the plow with the rear end of a tractor, whereby the plow will form a continuation of said tractor and readily follow the movement of the tractor and thus permit the plowing of corners and the like.

Another object of the invention is to provide a tractor plow having a three-point suspension, and novel means for preventing side draft or side slip on the tractor.

A further object of the invention is to provide an improved tractor plow embodying novel means for permitting the ready raising of the plow frame, whereby the plows can be withdrawn from out of the ground, when so desired so as to permit the easy turning of the tractor and the like.

A further object of the invention is to provide novel means for controlling the plow from the driver's seat of a tractor.

A still further object of the invention is to provide an improved tractor plow of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved tractor plow showing the same in operative position to a tractor, the tractor being shown in dotted lines.

Figure 2 is a top plan view of the improved plow showing the same attached to a tractor, the tractor being shown in dotted lines, and Figure 3 is a fragmentary perspective view of the rear end of the improved tractor plow illustrating the means for permitting the connection of the swivel guide wheel with the plow frame.

Referring to the drawings in detail, wherein similar reference characters designate corresponding parts throughout the several views, the letter A generally indicates the improved tractor plow and B a tractor with which the same can be associated.

The tractor B can of course be of any preferred character or make and can be provided with any preferred type of draw bar.

The improved plow A embodies a frame 5 including the side bars 6 and 7. The side bar 6 is extended beyond the side bar 5 and has its rear end connected to the rear end of the side bar 7 by a rear diagonal bar 8. The forward ends of the side bars 6 and 7 have secured thereto in any preferred way the transverse shaft 10 and hingedly mounted upon the shaft is the attaching draw bar plate 11. As shown this plate 11 extends transversely of the frame 5 and has its rear end provided with barrels 12 for receiving the said shaft. The draw bar plate 11 is secured to the draw bar of the tractor in any preferred way and according to the character of the draw bar carried by the said tractor. The frame is preferably braced by a transverse cross bar 13 and an inclined diagonally extending cross bar 14. The extreme rear end of the frame carries a casting 15 embodying a sleeve or vertically disposed bearing 16 for receiving the sliding post 17. The lower end of the post 17 is provided with an angularly extending fork 18 for rotatably supporting the castor wheel 19. The fork 18 is provided with a semi-annular stop flange 20 which is adapted to engage stops 21 formed on the sleeve 16 and thus it can be seen that when the yoke 18 is in engagement with the lower end of the sleeve 16, complete rotary movement of the castor wheel 19 is prevented which eliminates side draft on the tractor and frame 5. It is obvious however, that when the frame 5 is raised on the post 17 the axis of the semi-annular stop 20 is out of engagement with the sleeve 16 which permits free rotation of the said post.

The upper end of the post 17 has secured thereto stop collars 23 and 24 between which is positioned a collar 25 which permits free rotary movement of the post. This collar 25 is provided with a forwardly extending bifurcated arm 26, in which is slidably mounted the pivoted holding arm 27, the inner face of which is provided with oppositely directed upper and lower sets of teeth 28 and 28'. These teeth 28 and 28' are adapted to engage a suitable bolt or pin 29 carried by the bifurcated arm 26 which forms the means for permitting the holding of the frame in a raised or lowered position on the said post 17. This arm 27 is pivotally secured to the casting 15 by means of a pivot pin 30 and the arm is adapted to be moved toward and away from the pin 29 by means of a pull rope 31 which can lead toward the driver's seat of the tractor. However, the arm 27 is normally urged toward the pin 29 by means of a contractile coil spring 32 which is secured respectively to the sleeve 16 and to the said arm 27.

It can be seen that when the pin engages the teeth 28 the frame is held against raising movement on the post 17 and thus the plow held in engagement with the ground and that when the pin 29 is in engagement with the teeth 28', the frame will be held in a raised position and the plow out of engagement with the ground.

It is obvious that when the rope 31 is pulled the teeth 28 are moved away from the pin 29 which will permit the raising of the frame on the said post.

It is to be understood of course that one or more plows can be associated with the frame and that the frame can be made larger or smaller according to the number of plows to be carried thereby. As shown the frame supports two plows which include the standards 35 and the bottoms 36.

In order to permit the easy raising of the plows out of the ground without undue effort on the part of the operator, I provide a rock shaft 40 mounted in suitable bearings 41 carried by the side bars 6 and 7 and this rock shaft has keyed or otherwise secured thereto a crank or lifting leg 43. This crank or lifting leg 43 is made in sections 44 and 45 which are connected together by means of a knuckle joint 46, and a spring 47 is employed for normally holding the sections 44 and 45 in direct alignment with one another. Suitable stops 48 and 49 are provided for limiting the swinging movement of the said crank or lifting leg 43. A crank arm 50 is secured to the rock shaft 40 and a contractile coil spring 51 is secured to the said crank arm 50 and to a stationary portion of the frame, as at 52. It is thus obvious that the spring normally tends to hold the crank or lifting leg 43 in a raised position against the stop 48. Rockably mounted upon the shaft 10 is an operating hand lever 53 which is disposed adjacent to the driver's seat of the tractor and this lever 53 is connected by means of a link 54 with the crank 50.

Now in operation of the improved plow, when it is desired to raise the plow bottoms 36 from out of the ground, the driver pulls on the lever 53 which of course will rock the shaft 40 and bring the lifting leg 43 downward into engagement with the ground. The forward movement of the tractor will dig the lifting leg in the ground and move the same to complete vertical position which will raise the frame 5. The raising movement of the frame 5 will permit the dropping of the castor wheel 19, the yoke 18 and the post 17 downward and allow the pin 29 to engage in one of the lower set of teeth 28'. As soon as the pin 29 engages in one of the lower teeth 28 formed on the swinging bar 27, the castor wheel 19 will support the frame 5 and the plows in a raised position above the level of the ground. It is to be also noted of course that the frame 5 fulcrums on the shaft 10 which is carried by the draw bar plate 11. After the lifting leg has swung past the vertical, the knuckle joint 46 will break, that is the sections 44 and 45 will fold back against the tension of the spring 47, which will permit the spring 51 to automatically return the rock shaft 40 and the lifting leg 43 to its normal raised position.

Now when it is desired to permit the plow bottoms to again drop into engagement with the ground, it is merely necessary to pull upon the rope 31 which will swing the bar 27 from out of the path of the pins 29 and thus permit the dropping of the frame upon the post 17.

From the foregoing description it can be seen that I have provided an improved tractor plow having a three-point suspension and which is so constructed that the same practically forms an integral part of the tractor frame and will thus follow the same through all of its various movements and permit the close plowing to a fence and around the corners and the like. The tractor plow is also constructed so that only a few adjustments are necessary which are readily obvious to a person skilled in plowing.

The lower end of the section 44 of the lifting leg 43 can be provided with teeth 55 if so desired for facilitating the digging thereof in the ground.

While I have shown a particular type of plow and plow foot and standard attached to the frame, it is to be understood that other types of standards, plows and agricultural implements can be connected with the frame.

Changes in details may be made without departing from the spirit or the scope of this invention.

What I claim as new is:

1. The combination with a tractor including a draw bar, of a tractor plow including a frame, the forward end of the frame being supported on the rear end of the tractor on a horizontal pivot thereby permitting swinging movement thereof in a horizontal plane, a vertically disposed sleeve carried by the rear end of the frame, a post slidably mounted in said sleeve, and mounted for rotary movement therein, a castor wheel carried by the post, means for raising and lowering the frame on the post, plow bottoms carried by the frame, stops carried by the sleeve, stops carried by the post adapted to engage the stops formed on the sleeves when the frame is in its lowermost position for preventing rotary movement of the post therein, as and for the purpose specified.

2. In combination with a tractor, of a tractor plow, the forward end of the plow being supported on the rear end of the tractor on a horizontal pivot for swinging movement in a vertical plane, plow bottoms carried by the frame, a sleeve carried by the rear end of the frame, a post rotatably and slidably carried by the sleeve, a castor wheel carried by the post, means for raising the frame whereby downward sliding movement of the post in the sleeve is permitted, a pivoted notched bar carried by the frame and a stationary collar carried by the post, guide means carried by the collar for receiving the bar, a pin connected with said guide means for engaging in one of the notches in said bar for holding the frame in a raised position on the post, and means normally urging the notched bar toward said pin.

3. The combination with a tractor, of a tractor plow, including a frame, means connecting the tractor plow at its forward end to the rear end of the tractor for permitting the same to swing in a vertical plane, a rock shaft carried by the frame, a lifting leg secured to the rock shaft for movement therewith, means for rocking the shaft, means for holding the rock shaft in a predetermined position, said lift leg including a pair of sections, a knuckle joint connecting the sections together, a stop carried by the frame and disposed in the path of the upper section of the left leg, and resilient means for normally holding the sections in an aligned position, a rear castor wheel, a vertical spindle for the wheel slidably mounted in the frame, and means for latching the spindle in its raised or lowered positions.

In testimony whereof I affix my signature.

CHARLES HAFFKE.